Nov. 27, 1934.  L. MYERS  1,982,015
LADLE
Filed April 24, 1933   2 Sheets-Sheet 1
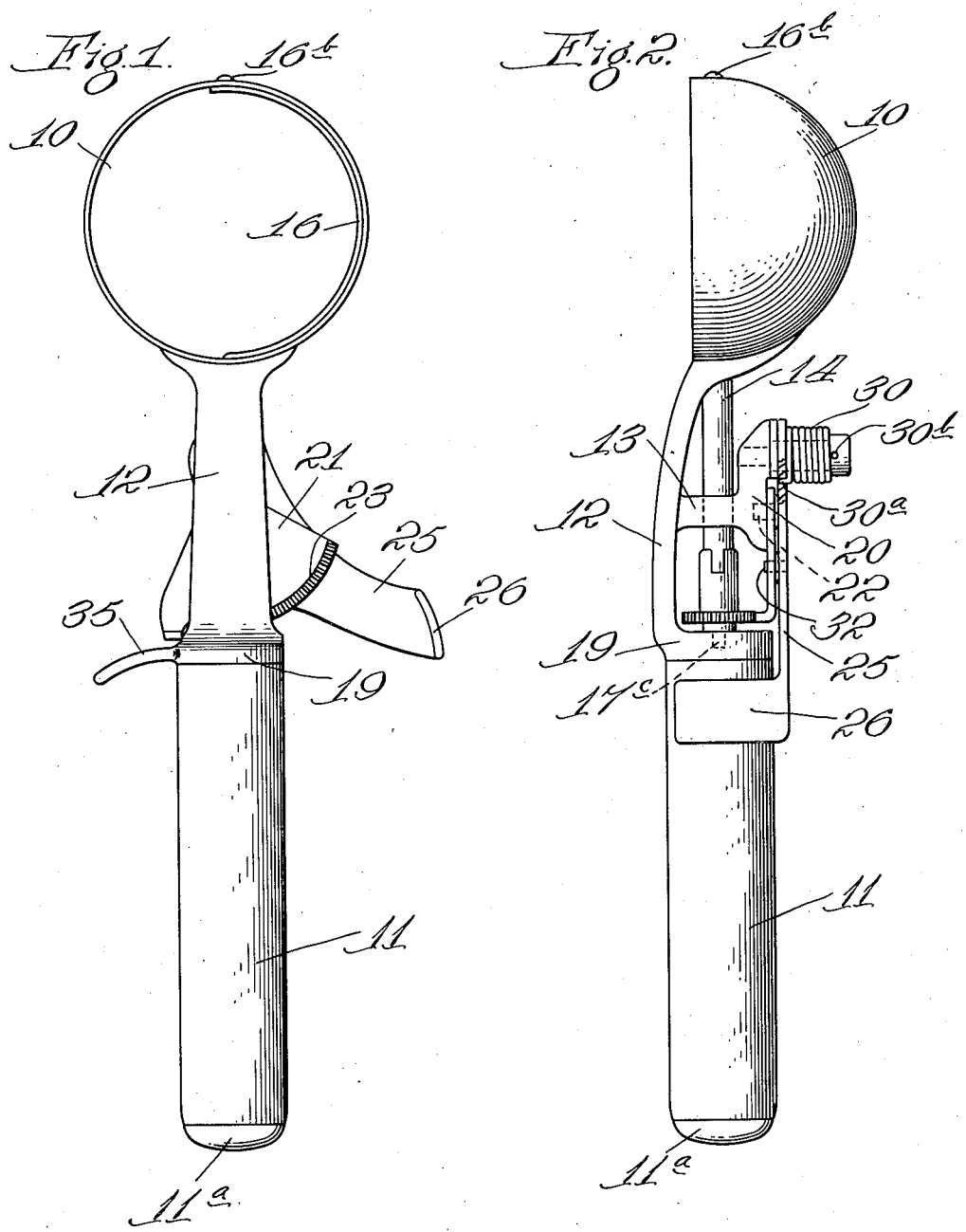

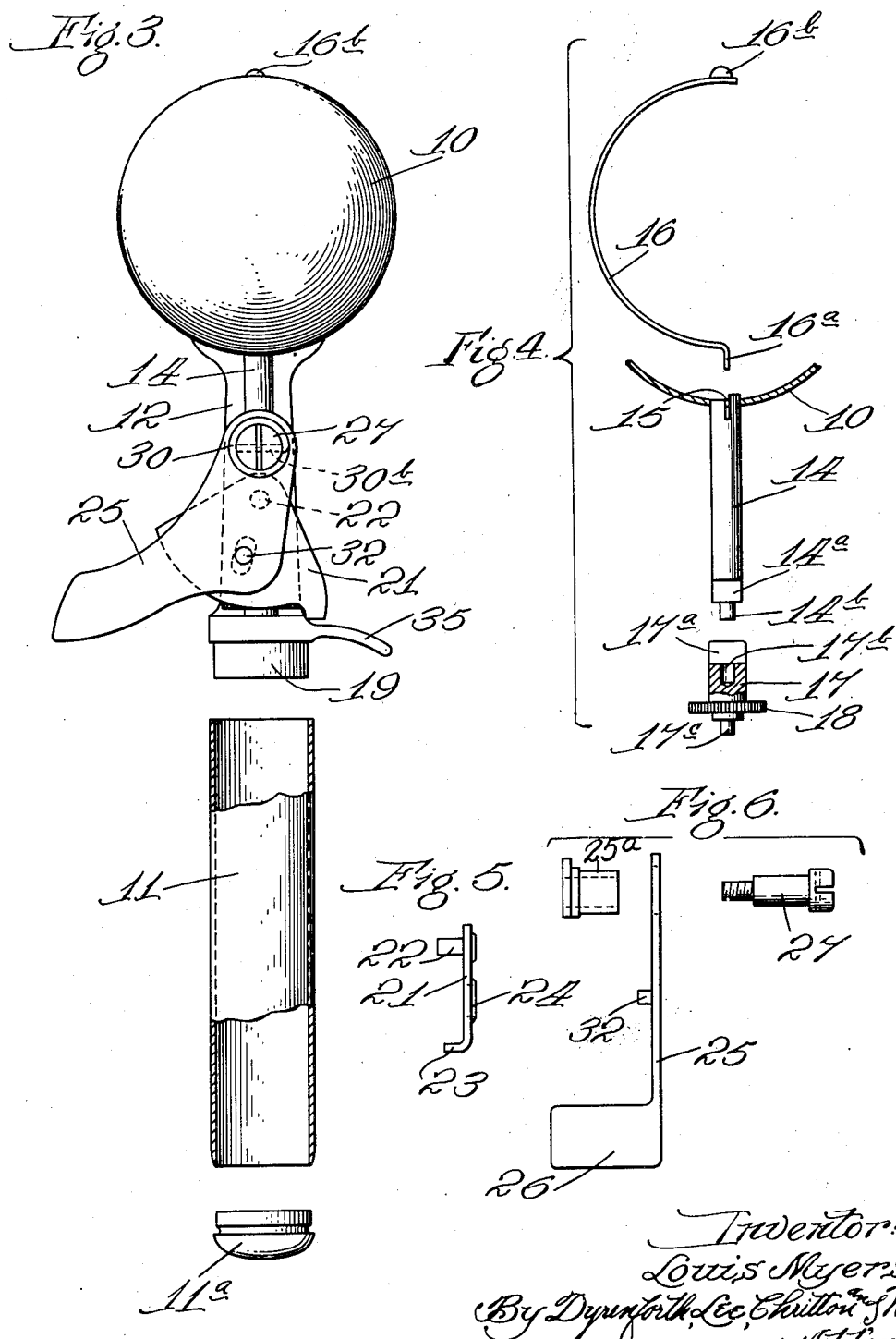

Patented Nov. 27, 1934

1,982,015

UNITED STATES PATENT OFFICE 1,982,015

LADLE

Louis Myers, Chicago, Ill.

Application April 24, 1933, Serial No. 667,719

4 Claims. (Cl. 107—48)

This invention relates to improvements in ladles and, more especially, a self-emptying ladle of the type commonly used in dispensing icecreams and similar semi-solid materials.

Among the features of my invention is the provision of such a ladle that can be easily and cheaply manufactured and one which is simple, efficient and strong in construction and operation.

Another feature of my invention is the provision of a ladle that can readily be assembled and disassembled, thus facilitating cleaning and repairing.

Other features and advantages of my invention will appear more fully as I proceed with my specification.

In that form of device embodying the features of my invention shown in the accompanying drawings—

Figure 1 is a top plan view; Fig. 2 is a view in side elevation; Fig. 3 is a bottom plan view; Fig. 4 is an expanded view of some of the parts; Fig. 5 is a view of the intermediate lever; and Fig. 6 is a view of the hand-operated lever.

As shown in the drawings, the ladle includes a hemispherical bowl 10 with a tubular handle 11. The end of the handle 11 is provided with a removable disc 11a adapted to bear a particular number, color or other index to show the capacity or size of the ladle. Ladles of the type here shown are frequently employed in different sizes. When not in use they are commonly submerged in rinsing or cleaning water. When thus submerged, the ends of the handles are the only parts visible. Consequently, it is difficult to tell the size of the ladle without removing it from the rinsing water. By the use of the removable members 11a on the handles, such members can bear indicia indicating the sizes of the ladles. Consequently, by reference to these exposed ends of the handles, the particular ladle desired is readily determinable.

The handle 11 has a flattened portion 12 connecting it to the bowl 10. This may be considered as a portion of the handle or as a separate bridging member. The member 12 carries a bearing 13 in which is rotatably mounted the scraper-operating shaft 14. The outer end of this shaft also finds a bearing in the wall of the bowl 10, as shown in Fig. 4; and the same is provided with a slot 15 adapted to receive the end 16a of the semi-circular scraper or knife 16. The outer end of this knife is provided with a projection 16b adapted to extend through a hole in the wall of the bowl 10 opposite the bearing for the shaft 14.

The inner end of the shaft 14 is provided with a flattened blade 14a which carries a centrally arranged cylindrical projection 14b. 17 indicates an extension shaft provided with a gear 18. This shaft is provided with a slot 17a and a socket 17b to receive the portions 14a and 14b, respectively, on the end of the shaft 14. The other end of the extension shaft 17 is provided with a cylindrical projection 17c adapted to seat in a suitable bearing in the member 19 which is joined to the bridging member 12 and serves to carry the handle 11.

The following means are provided for rotating the shaft 14 to swing the scraper or knife 16 in the bowl 10 to loosen the contents thereof in the usual manner. For this purpose, the lower end of the bearing member 13 is provided with an enlarged base or support 20 on which is pivotally mounted the intermediate lever 21 by means of the pin 22. This lever carries a curved rack bar 23 meshing with the teeth on the gear wheel 18. This intermediate lever 21 is provided with a slot 24 for a purpose to be hereinafter explained.

Pivotally mounted on the member 20 is an operating lever 25 provided with a finger portion 26. The pivotal mounting is accomplished in the following manner. 27 indicates a screw threaded into the member 20. This screw carries a sleeve 25a with a flange. The lever 25 is provided with a hole so that it is rotatably mounted on the sleeve 25a which is held in position by the screw 27. 30 indicates a spiral spring surrounding the sleeve 25a with its inner end 30a in a suitable socket in the lever 25 and its outer end 30b inserted in a hole in the head of the screw 27. This spring urges the lever 25 to the position shown in Fig. 1. In this position the knife 16 is at one edge of the bowl prior to the scraping operation. The operating lever 25 carries a pin 32 engaging in the slot 24 in the intermediate lever 21. By this connection it will be seen that swinging of the lever 25 by pressure on the finger portion 26 will also swing the intermediate lever 21 to cause the rack bar 23 to rotate the gear or pinion 18 to operate the scraper.

35 indicates a spur on the member 19 to assist in gripping the device and to offer a portion for the pressure of the first finger in forcing the bowl into a hard substance.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A ladle, including; a bowl; a handle; a bridging member joining the bowl to the handle; a scraper swingably mounted in the bowl; a bearing carried by the bridging member under the same; a scraper-operating shaft alined with the handle and rotatably mounted in said bearing; an extension shaft detachably connected to the end of said shaft and lying between said bearing and the handle, said extension shaft having a bearing in the end of the handle; a gear on the extension shaft; a pivotally mounted lever provided with a curved rack bar engaging said gear; and means for swinging said lever.

2. A device as claimed in claim 1, in which the means for swinging the lever includes a second hand-operated lever.

3. A ladle, including; a bowl; a handle; a bridging member joining the handle to the bowl; a bearing carried by the bridging member; a scraper-operating shaft alined with the handle and rotatably mounted in the bearing; a gear carried by said shaft; a support on the bearing; a lever pivotally mounted on said support; and a curved rack bar on said lever engaging said gear.

4. A device as claimed in claim 3, in which a second lever is pivotally mounted on the support on the bearing, said second lever being hand-operated and connected to the lever with the curved rack bar.

LOUIS MYERS.